Oct. 15, 1929.　　　F. L. MAIN　　　1,731,632

PRESSURE INDICATOR

Filed Feb. 25, 1928　　　2 Sheets-Sheet 1

INVENTOR.
Frank L. Main.
BY
Edward N. Pagelsen,
ATTORNEY.

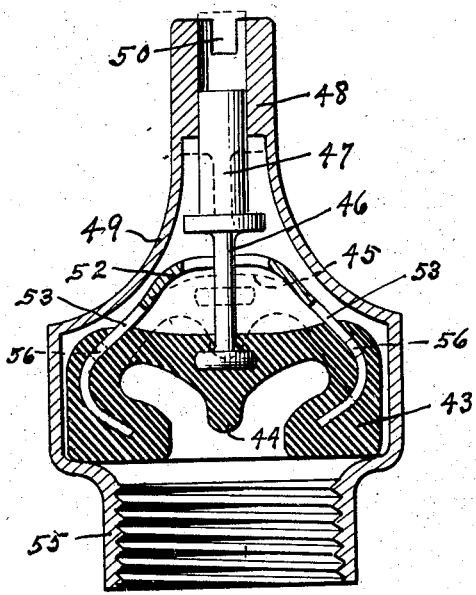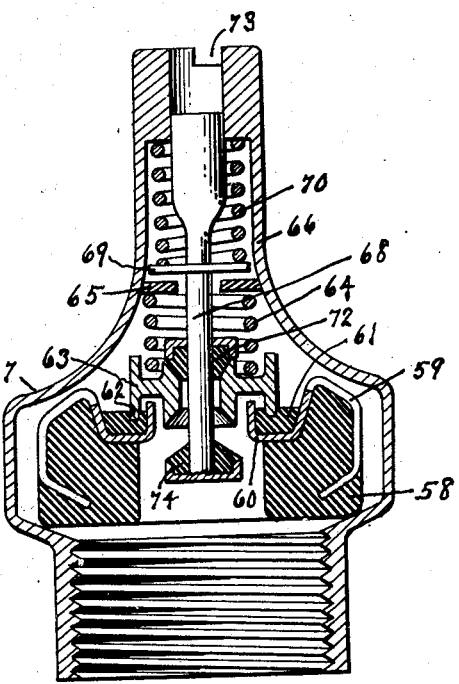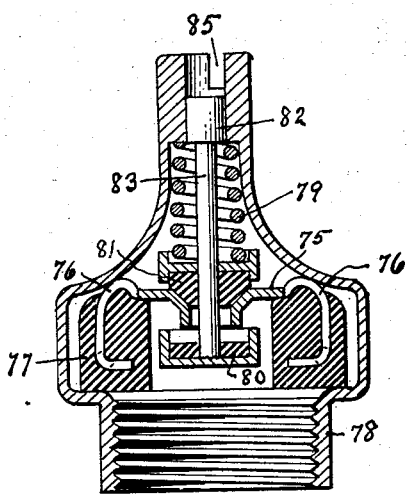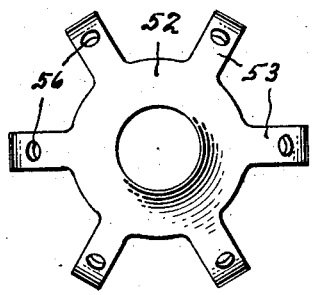

Patented Oct. 15, 1929

1,731,632

UNITED STATES PATENT OFFICE

FRANK L. MAIN, OF JACKSON, MICHIGAN

PRESSURE INDICATOR

Application filed February 25, 1928. Serial No. 256,926.

This invention relates to that class of devices which indicate a predetermined pressure, or divergence therefrom, in receptacles for compressed air or other gases, but particularly in the inner tubes of the tires of vehicle wheels, and its object is to provide a device of this character which can be quickly attached and detached, which can be produced at small cost, and which shall be so simple in construction that it will be operative when no larger than the ordinary tire tube caps now in use.

This invention consists in a shell, adapted to be screwed onto a valve tube or other connection, a variable cup or chamber therein open toward said valve stem or other connection and adapted to have its rim pressed against said connection by the shell when that is screwed onto the connection, an indicator movably mounted in the shell, and a spring to force the indicator and a portion of the cup toward the connection against the pressure of air or other gas within said cup.

It further consists in the details of construction illustrated in the accompanying drawing and particularly pointed out in the claims.

Figure 3:
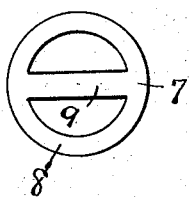
Figure 3, is a view of a plate forming a part of the structure shown in Figure 1.

Figures 4 to 7 inclusive are central longitudinal sections of other embodiments of this invention;

Figure 8 is a plan of a reinforcing and antifriction stamping adapted to be connected to the pneumatic cup shown in Figures 5 to 7 inclusive.

Similar reference characters refer to like parts throughout the several views.

Figure 1:
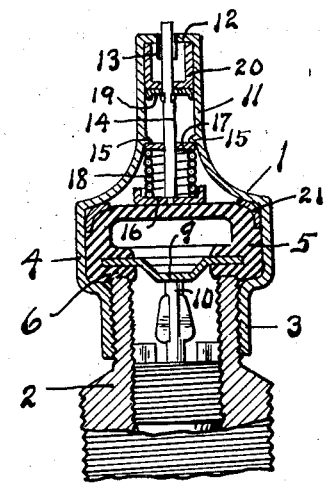
Figure 1, is a central longitudinal section of a pressure indicator embodying the present invention.

This indicator is not designed to indicate regular variations in pressure but to indicate the presence of a predetermined pressure, or a lack or an excess thereof. The shell 1 is shown attached to a well known tire valve tube 2 or other connection in any desired manner, but it is preferably screwed onto the end of the connection, the end 3 being screw internally threaded. The intermediate portion 4 of the shell constitutes a chamber which receives the rubber cup 5 which is so inserted that its edge 6 may be forced against the tube 2. A plate 7 may be positioned within this cup when it is molded, the plate consisting of a rim 8 and a cross-bar 9, as shown in Figure 3, the cross-bar 9 being bent to act as a deflector as shown in Figure 1, engaging the stem 10 of a tire valve and forcing it from its seat to permit air to pass from the tire to the cup 5. As the valve tube, tire valve and tire are all well known, no illustration thereof is necessary The outer portion 11 of the shell is reduced in diameter and its end is partially closed by the flange 12, the usual transverse notch 13 being formed to permit the shell to be used for removing and replacing tire valves in the usual manner. A stem 14 is slidably mounted in this reduced end of the shell and a bearing plate 16 is attached to the inner end of the stem. Small projections 15 may be formed on the inner side of the shell to limit the outward movement of the plate 17 which serves to guide the stem and also serves as an abutment for the calibrated spring 18 which engages the plate 15. The outer end of the stem may be guided by a plate 19 whose movement is limited by a thimble 20 but this plate 19 may be omitted if desired. The filling ring 21 may be placed on the outer shoulder of the cup, if desired. This ring reduces the friction between the shell and the cup and permits the shell to turn relative to the cup after the edge of the cup engages the end of the connection 2, thereby insuring a tight seat of the cup upon the end of the connection.

When this indicator is to be mounted on a valve tube of a vehicle tire, the tire is first inflated to the desired pressure, after which this indicator is screwed onto the end of the valve tube until the cross-bar 9 presses the stem 10 of the tire valve inwardly to move this valve off its seat, and causes an air tight fit of the cup 5 on the end of the valve tube, air from the tire expands the cup 5 and presses out the plate 16 and the indicator stem 14 until it projects beyond the outer end of the shell where it will remain until the pressure in the tire drops below the predetermined lower limit. As the stem 14 projects from the end of the case until the spring 18 begins to force the stem inwardly, sufficient pressure is quickly found at a glance. When the stem 14 begins to move inward, the amount of such movement can be noted through the notch 13 in the end of the case.

While any desired process may be employed to construct and assemble this indicator, one method is to form the shell with the part 3 continuous with the part 4, to insert the various parts shown in Figure 1, and then spin down the part 3 to the desired diameter, forming the thread at the same time.

Figure 2:
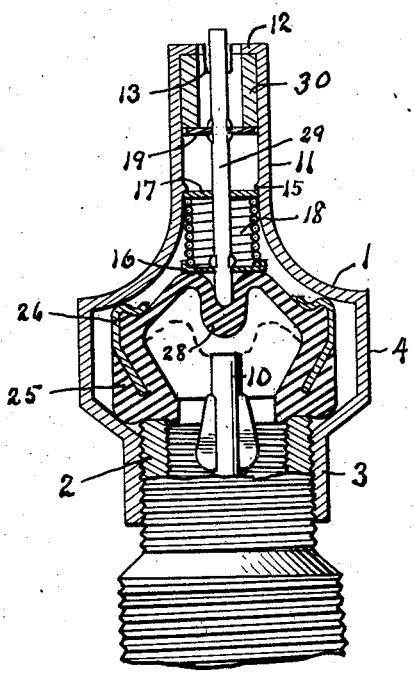
Figure 2, is a similar view of a modified form of indicator.

The shell shown in Figure 2 is similar in construction to that shown in Figure 1. The cup 25 is of rubber and reinforced by the metal ring 26 which engages the inner shoulder 27 of the shell and presses the edge of the cup against the connection 2, and serves to so reduce the friction between the cup and shell that the cup will not turn on the tube 2 but will turn in the shell. The cup is formed with an inner boss 28 which receives the stem 29 and by which it can be forced down to engage the valve stem 10 to force the tire valve off its seat, which will result in air from the tire forcing this boss outward if the pressure is sufficient to overcome the force of the spring 18. I have shown the disk 19 secured to the stem 29 and a short piece of tubing 30 in the outer end of the shell to serve as an abutment for the disk 19.

Figure 4:
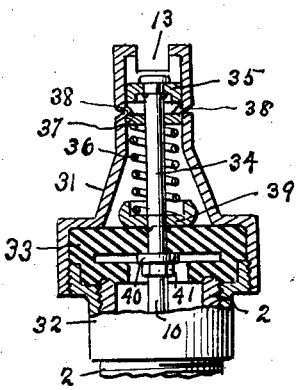

The shell 31 shown in Figure 4 is threaded to fit a hub 32 which screws onto the valve tube 2 and thus permits the introduction of the cup 33 before the hub 32 is attached to the shell. The stem 34 is guided by a small piston 35 and the spring 36 abuts against a disk 37 which is held in place by small ears 38 which may be pressed in after the disk 35 and stem are in position. A plate 39 between the cup and the spring prevents the spring from cutting the cup while the stem is positioned relative to the cup by means of a collar 40 and nut 41. This nut is shown in engagement with the valve stem 10 in the drawing but an increase of pressure will force out the stem 34 until it is visible through the notch 13.

In Figure 5, the device shown in the spring is omitted, the cup 43 being sufficiently resilient to assume the position shown in this figure, when the boss 44 engages the valve stem and depresses it sufficiently to permit air to flow into the cup, and if under sufficient pressure, force the cup to the position shown in dotted lines 45. The stem 46 has a guide portion 47 slidable in the upper end 48 of the shell 49 until it is visible through the notch 50. In order to avoid the friction between the body 51 and the cup, I prefer to form a spider 52 (Figure 8) with arms 53 which are embedded in the rubber, this spider engaging the inner surface of the shell and pressing the cup against the end of the valve tube, but as the friction between the metal parts is less than between rubber and metal, the cup will not grind around on the end of the valve tube. This construction permits the cup to be contracted so it may pass through the reduced threaded end 55 of the shell, and after insertion, it may be expanded by a proper tool to bend out the arms 53 of the spider. Holes 56 in these arms permit the plastic rubber to flow through before it is vulcanized.

The construction shown in Figure 6 is intended as an audible as well as a visible indicator. The rubber ring 58 carries a spider comprising arms 59 and a channel ring 60 in which is mounted a rubber seat 61 for the cylindrical flange 62 on the double valve-seat 63. This flange is held against the seat 61 by means of a spring 64 which abuts the disk 65 positioned in the reduced portion 66 of the shell 67. When the shell is screwed onto a connection so that the ring 58 forms a tight joint therewith, this double valve-seat becomes an extension of such connection.

The stem 68 carries a plate 69 which is engaged by the spring 70 to normally hold the valve 72 on this stem against its seat, at which time the lower end of the stem engages the tire valve and holds it open. Pressure within the collar may raise the stem 68 and press the inner valve 74 against its seat in which case the outer end of the valve stem will be visible through the notch 73 and thus indicate the desired pressure. When the pressure on the tire falls, the outer spring 70 will move the stem 68 inwardly and air will rush out through the double valve-seat 63 with a whistling sound until the pressure falls so low that it cannot resist the force of the spring 70. The outer end of the stem 68 is sufficiently loose in the shell to permit the escape of air. As the spring 70 will be calibrated within a few pounds, valve 72 will seat securely and prevent further deflation, until the cap is removed for reinflation. Spring 64 should be calibrated to the maximum desired pressure which will, of course, exceed the capacity of spring 70. If on inflation the pressure exceeds the capacity of spring 64, valve 62 will open and release the excess pressure with a buzzing noise. The device thus shown in Figure 6 not only indicates low and desired pressure, but also indicates and reduces excessive pressure to the amount required.

The structure shown in Figure 7 is similar to that of Figure 6 except that Figure 7 is an indicator somewhat resembling a poppet type escape valve. The spider also has arms 76 which may be bent inwardly to permit the rubber ring 77 to be passed through the reduced portion of the shell 78. The spring 79 tends to hold the valve 81 on its seat and to move the tire valve from its seat, thus admitting air under pressure to the space below the spider 75, and if this air is under sufficient pressure, it will press the valve 80 outwardly against its seat. But should this pressure be insufficient to fully overcome the force of the spring 79, it will escape past the valve 81 and around the outer end 82 of the stem 83 with a whistling sound until the pressure falls sufficiently to permit the spring 79 to press the valve 81 against its seat, at which time the outer end 82 of the stem will not be visible through the notch 85. Should the air within the space below the double seat 63 of Figure 6 and below the spider 75 of Figure 7 slowly escape and thus lose pressure, the valves will slowly move in and out, and may create sufficient noise to be recognized when the vehicle is at rest thus indicating that there is sufficient pressure in the tires but that the indicator needs tightening on the valve. The amount of air thus lost is very small and of no practical importance.

The invention may be embodied in other modifications by those skilled in the art without departing from the spirit of my invention, as set forth in the following claims.

I claim:—

1. In a pressure indicator adapted to be attached to a tubular connection, the combination of an elastic cup, a shell enclosing said cup and adapted to press the edge thereof against said connection to form a fluid-tight joint therewith, said cup being adapted to receive fluid pressure from said connection and be inflated thereby, a spring to reduce the size of said cup, and means to indicate such reduction.

2. In a pressure indicator, the combination of a shell having an open end, the opposite end being reduced in diameter, an elastic air chamber rotatably mounted in the shell and provided with an opening directed toward the open end of the shell, said shell being attachable to a connection to a receptacle under fluid pressure, the shell causing said chamber to form a fluid-tight joint with said connection, a calibrated spring adapted to deflate said chamber, and means to indicate such deflation.

3. In a pressure indicator for automobile tires embodying tire valves, a body adapted to be attached to said tire valve, an indicator member movable therein, a calibrated spring properly shielded, an air chamber open at one end and rotatable in the body, a valve deflector mounted in the chamber and automatically operating in conjunction with the chamber, the spring and the indicator to open the valve of the tire.

4. In a pressure indicator, the combination of a rigid body provided with integral means for fixed application to a source of fluid under pressure, a rubber air chamber free to rotate in the body, a spring calibrated to resist expansion of the chamber under fluid pressure, and an indicator pin free mounted in the end of the body and movable inwardly and outwardly by the spring and air chamber to indicate the pressure in said chamber.

5. In a pressure indicator, a metal shell, a rubber air chamber within the shell, a reinforcement molded in said chamber and so disposed as to provide a bearing surface between the shell and chamber.

6. In a pressure indicator, a metal shell having a tubular extension, a rubber air chamber within the shell, a stem extending from said chamber toward the outer end of said extension and movable therein, and a spring to contract said chamber, said extension having a notch through which said stem may be seen when at the outer limit of its movement.

7. In a pressure indicator, a metal shell having a tubular extension provided with a longitudinal notch at its outer end, a stem slidable within such extension and visible through said notch at the outer limit of its movement, means connected to said stem to cause it to move outwardly when proper fluid pressure is present at its inner end, and means to move the stem inwardly upon failure of such pressure.

8. In a pressure indicator adapted to be attached to a valve-body, means for opening a valve in said body to which the indicator is attached, and means for automatically releasing said valve when pressure is indicated.

9. In a pressure indicator a shell, an air chamber within the shell, and means to permit the shell to rotate independently of the air chamber.

10. In a pressure indicator, a shell, an air chamber within and freely rotatable in said shell, and means for reinforcing the air chamber against circumferential expansion under pressure.

11. In a pressure indicator, a body, an air chamber therein, and an indicator pin within said body, said body having a slot through which said pin will be visible to indicate predetermined pressure.

12. In a pressure indicator, a cylindrical shell tapering at one end, an air chamber within the other end, said tapering end having a rectangular slot, and means visible through said slot for indicating pressure in said chamber.

13. In a pressure indicator, a funnel-shaped shell, an air chamber therein which chamber is calibrated to expand under predetermined pressure, a castellated slot in the apex of the shell, and means through which the expansion of the chamber is indicated at said slot.

14. In a pressure indicator, a body, a movable indicating stem, and an expansible air chamber to move said stem at predetermined pressures to such position as to be visible.

FRANK L. MAIN.